July 28, 1936.    W. G. DUNN    2,048,732
WIND WHEEL GENERATOR
Filed Aug. 13, 1935
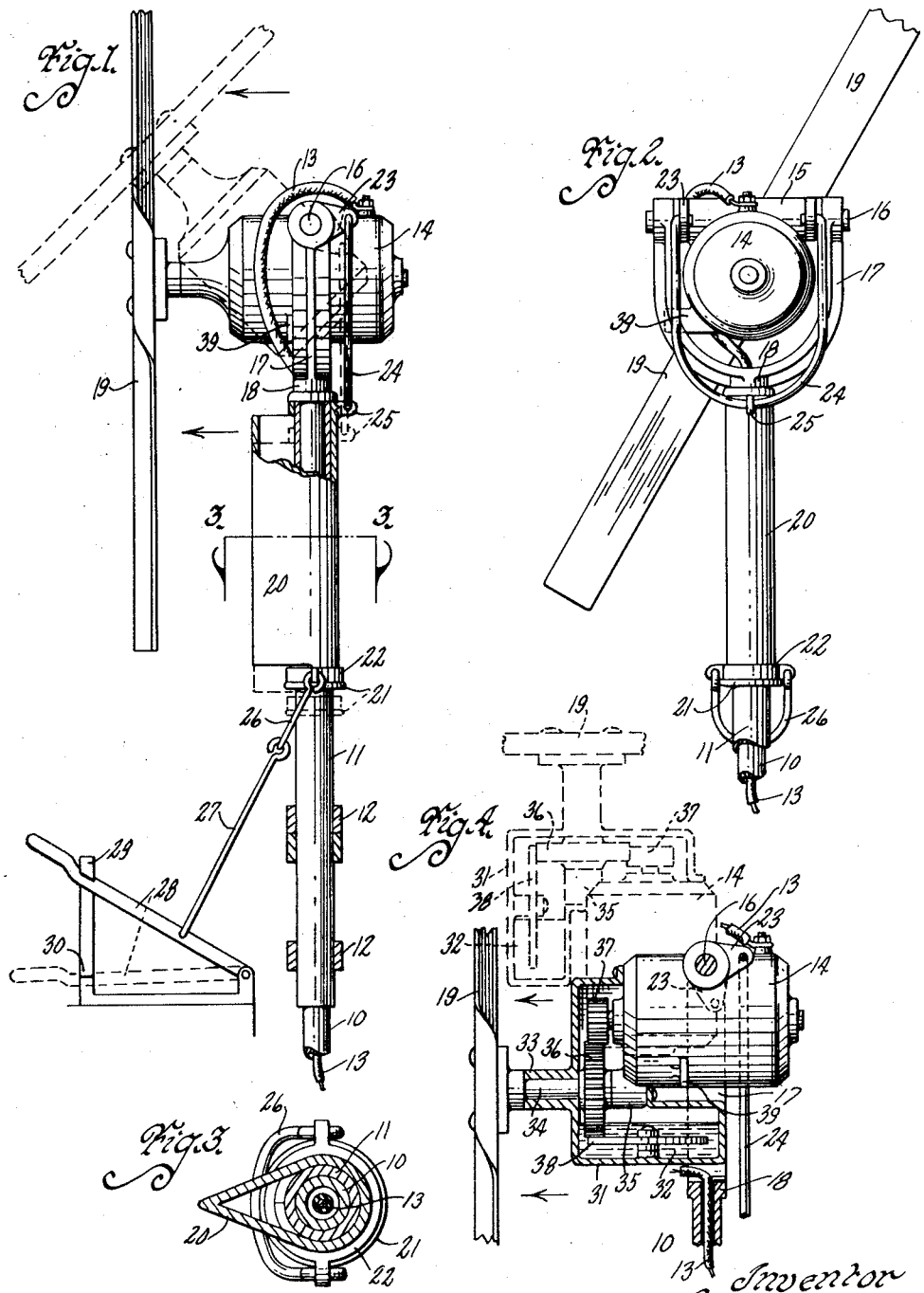
Witness
Edw. Seeley
Inventor
William G. Dunn
by Bair, Freeman & Sinclair
Attorneys Patented July 28, 1936

2,048,732

UNITED STATES PATENT OFFICE 2,048,732

WIND WHEEL GENERATOR

William G. Dunn, Clarinda, Iowa

Application August 13, 1935, Serial No. 35,957

6 Claims. (Cl. 290—55)

My invention relates to a wind wheel generator.

It is my purpose in my present invention to provide a wind wheel generator which is very simple of construction, inexpensive of manufacture and steady enough to have a long life with minimum repair requirements.

A further and more particular object is to provide a wind wheel generator in which the wheel is supported on the generator and the generator is pivoted on a horizontal axis above the center of gravity of the device, so that the wind approaches the wheel from the generator side thereof, and so that in a very strong wind, the wheel and generator will tilt, so as to bring them into equilibrium with the generator and assume a balance where the wheel will not be driven too rapidly. There is thus provided an automatically governing structure.

Still another purpose is to provide in such a type of wind wheel a stream-line sleeve back of the lower part of the wheel for reducing to a minimum the formation of eddies adjacent the lower part of the wheel.

An additional object of my present invention is to provide such a structure in which the stream-line sleeve and the manual swivel throw-out are combined in an efficient mechanical device.

Another object is to provide a structure of the kind under consideration in which the wheel is connected to the generator by gearing for thus affording a higher generator speed and a novel oiling means is provided.

With these and other objects in view, my invention consists in the construction, arrangement and combination of the various parts of my wind wheel generator, whereby the objects contemplated are attained, as hereinafter more fully set forth, pointed out in my claims, and illustrated in the accompanying drawing, in which:

Figure 1 is a side elevation of a wind wheel generator embodying a form of my invention, parts being broken away and parts being shown in section.

Figure 2 is a rear elevation of the same.

Figure 3 is a vertical section taken on the line 3—3 of Figure 2; and

Figure 4 is a side elevation of a slightly modified form of my device, provided with gears and an oiling system, parts being broken away and parts being shown in section.

In the accompanying drawing, I have shown the wind generator supported on an upright in the form of a pipe 10, which is journaled in a sleeve 11. The sleeve is supported on the frame members 12 of a suitable tower, not otherwise shown.

The wiring from the generator, indicated at 13, extends to the bottom of the tower, and any suitable means, such for instance as that shown in my previous application, Serial No. 16,371, filed April 13, 1935, may be used for taking the current from the generator and eliminating any danger arising from twisting of the wire.

The generator itself is indicated at 14. It has at the top the oppositely projecting stud or the like 15 forming a journal for the shaft 16. The outer ends of the shaft 16 are journaled in the arms of a yoke 17, the lower end of which as at 18 is fixed to the pipe 10.

Thus the generator and its yoke may rotate with the shaft 10 and the generator is allowed pivotal movement in the yoke.

A wind wheel 19 is operatively connected to the generator shaft in the form of the device shown in Figures 1 and 2.

It will be observed that the axis of the pivotal mounting of the generator is substantially above the center of gravity of the generator and the wind wheel and it is located forwardly of the wheel. That is the wind blows past the generator to reach the wheel. On account of this arrangement, it is obvious that when the wind pressure on the wheel becomes strong enough, the generator and wheel will tend to swing from the position shown in full lines in Figure 1 to the position shown in dotted lines in that figure for bringing the device into equilibrium with the wind. Thereupon the wind will not rotate the wheel as fast as it would if the wheel were kept down to the full line position shown in Figure 1, and there is provided a self-governing structure, so far as the speed of the wheel is concerned.

In an arrangement of this kind, where the wind strikes the wheel in the manner mentioned, there is ordinarily a tendency toward the formation of eddies between the lower part of the wind wheel and the sleeve 11, which eddies shield part of the area swept by the propeller of the wheel. To reduce these eddies to a minimum and in order to make them as little harmful as possible, I have mounted on the sleeve 11 a stream-line sleeve 20. This sleeve at its lower end has a short tubular extension terminating in an annular flange 21. On the tubular extension is mounted a ring 22, the purpose of which will be later referred to.

I provide means for manually swinging the generator from its full line position shown in Figure 1 to upright position. For this purpose, I provide rearwardly extending ears 23 on the journal stud 15. Pivoted to the ears 23 are the ends of a bail 24. The lower end of the bail 24 extends through an ear 25 on the rear of the stream-line sleeve 20.

Pivoted to the ring 22 is a link or any suitable device 26, which is connected by a link or other suitable member 27 with a control lever 28, located on the ground or within convenient reach.

When the lever 28 is in its upward position, where it is held by the weight of the generator, the parts are in the position shown in full lines in Figure 1.

If it is desired to stop the wheel, the lever 28 is moved downwardly from a catch 29 to where it can be pushed under a catch 30. This pulls the stream-line sleeve and the bail downwardly and tilts the generator to upright position, where the wheel will not be operated effectively by the wind.

In Figure 4, I have shown a modified form of my invention, in which the parts are the same as those already described with the exceptions now to be mentioned. I have omitted from the showing in Figure 4, the sleeve 11 and the parts below the generator.

In the modified form, there is fastened to the front of the generator, a casing 31, the lower part of which forms an oil chamber 32. Projecting from the casing 31 is a bearing 33 for the shaft 34 of the wind wheel 19. This shaft is also mounted at its rear end in a bearing 35 within the casing 31. On the shaft 34 within the casing 31 is a gear 36 meshing with a gear 37 on the generator shaft.

The purpose of providing the gearing is to run the generator at a higher speed than is produced when the wind wheel is connected directly to the generator shaft.

The use of the gears makes necessary the provision of means for oiling them. When the parts are in their normal position as shown in Figure 4, the lower gear 36 picks up oil and the parts are thus properly lubricated. However, when the wheel tilts to the position shown by dotted lines in Figure 4, or when it operates idly, which it does to some slight extent when it is tilted to horizontal position, it is desirable that means be provided for affording lubrication to the gears. For this purpose, I have mounted a rotary disc 38 in the lower part of the casing 31 with its face in contact with the gear 36, so as to be rotated thereby. Thus when the device is tilted to position where the oil does not touch the gear 36 and the wheel runs, then the gear 36 will rotate the disc 38, which will convey to the gear a supply of lubricant.

It will be observed that lugs 39 on the generator casing engage the arms of the yoke 17 and limit the tilting movement of the generator in one direction.

When the generator is tilted to vertical position, the location of the axis of the shaft 16 is such that the weight of the parts tends to pull them back to normal position.

In the operation of the wind wheel, it is installed as shown in Figure 1 and by gravity will naturally assume that position. The wind wheel itself and the stream-lined sleeve 20 both tend to keep the wheel turned to a proper position for operation by wind blowing in any direction. The lower end of the sleeve 20 turns freely in the ring 22.

As the wind blows, the wheel is rotated for operating the generator. If the speed of the wind increases beyond a certain velocity, the pressure of the wind on the wheel, on account of the location of the axis of the shaft 16 swings the wheel and generator from their position shown in full lines in Figure 1 toward the position indicated by dotted lines.

It will be obvious that if the device modified as shown in Figure 4 is employed, the operation will be the same, and that when the wheel is tilted away from the horizontal to, for instance, the dotted line position of Figure 1, then the disc 38 will supply oil to the gears.

If it is desired to manually move the wheel to inoperative position, the lever 28 may be swung from its position shown in Figure 1 to its dotted line position there illustrated, whereupon the parts will be moved to position where the wheel is horizontal, as illustrated for instance in the dotted line showing of Figure 4.

The construction here shown has advantages which will already have appeared. The wheel automatically adjusts itself in high winds, so as to reduce the strain on the parts and to avoid operation at excessive speeds. Arranging the wheel on the leeward side of the generator, necessity for a vane is eliminated. The provision of the stream-lined sleeve reduces to a minimum the undesirable effects of eddies caused by the sleeve 11. The provision of the oiling apparatus of Figure 4 makes it possible to utilize the general type of structure shown and at the same time to have sufficient lubrication where gears are used.

It will, of course, be obvious that changes may be made in the device, particularly in the use of materials and arrangement and construction of parts, and it is my intention to cover by my claims, any modifications of the illustrated disclosure, which may be included within their scope and within the scope of my invention.

I claim as my invention:

1. A generator having a wind wheel associated therewith, a yoke for supporting said generator for pivotal movement on an axis above the center of gravity of the generator and wind wheel and spaced from the center of gravity on the side away from the wind wheel, and means for supporting said yoke for rotary movement, and a stream-lined sleeve on said means behind said wind wheel adapted to rotate on a vertical axis with the generator and yoke.

2. In a device of the kind described, a generator, a wind wheel operatively associated with the generator, an upright yoke, said generator being pivotally supported on the arms of the yoke rearwardly and above the center of gravity of the wheel and the generator, an upright secured to the yoke and journaled for rotation, a sleeve in which the upper part of the upright is journaled, a stream-line sleeve on said first sleeve forwardly of the wheel, a bail having arms with pivotal connections to the generator rearwardly of the yoke and having a pivotal connection with said second sleeve, a ring on the lower part of said second sleeve in which said sleeve may rotate, and means connected with the ring for sliding the second sleeve on the first sleeve and thus tilting the generator.

3. In a device of the class described, a fixed sleeve, a pipe journaled in the sleeve, a yoke extending upwardly from the pipe, a generator horizontally journaled on the arms of said yoke at its upper part between its ends, in the vertical plane of the axis of the pipe, a wind wheel supported on one end of the generator and operatively connected therewith so that the center of gravity of the wheel and generator is on the wheel side of the horizontal axis of the generator.

4. In a device of the class described, a fixed sleeve, a pipe journaled in the sleeve, a yoke extending upwardly from the pipe, a generator horizontally journaled on the arms of said yoke at its upper part between its ends, in the vertical plane of the axis of the pipe, a wind wheel supported on one end of the generator and operatively connected therewith so that the center of gravity of the wheel and generator is on the wheel side of the horizontal axis of the generator, arms on the generator projecting away from the wheel and the horizontal axis, a yoke receiving the generator and having arms pivoted to said last-named arms, a slidable sleeve secured to said last yoke and on said first sleeve, a collar rotatably mounted on the slidable sleeve, and means for actuating said collar for sliding the slidable sleeve and tipping the generator and wheel.

5. In a device of the class described, a fixed sleeve, a pipe journaled in the sleeve, a yoke extending upwardly from the pipe, a generator received between the arms of said yoke, a horizontal shaft connected to the top of the generator and journaled in said arms in the plane of the vertical axis of the pipe, a wind wheel supported on one end of the generator and operatively connected therewith so that the center of gravity of the wheel and generator is on the wheel side of the horizontal axis of the generator, and means for manually tipping the wind wheel and generator on the axis of said shaft.

6. In a device of the class described, a fixed support, a yoke rotatably journaled thereon on a vertical axis, with its arms extending upwardly, a generator horizontally journaled substantially above its center of gravity, between said arms, a wind wheel operatively connected with the generator, and supported thereby so that the center of gravity of the generator and wheel is on the wheel side of the horizontal axis of the generator, means rotatably and slidably mounted on the support, to tilt the generator when slid vertically, means rotatably but non-slidably associated with the first means for sliding the first means vertically.

WILLIAM G. DUNN.